No. 677,307. Patented June 25, 1901.
F. L. COOK.
BUBBLE BLOWING DEVICE.
(Application filed Oct. 26, 1900.)
(No Model.)
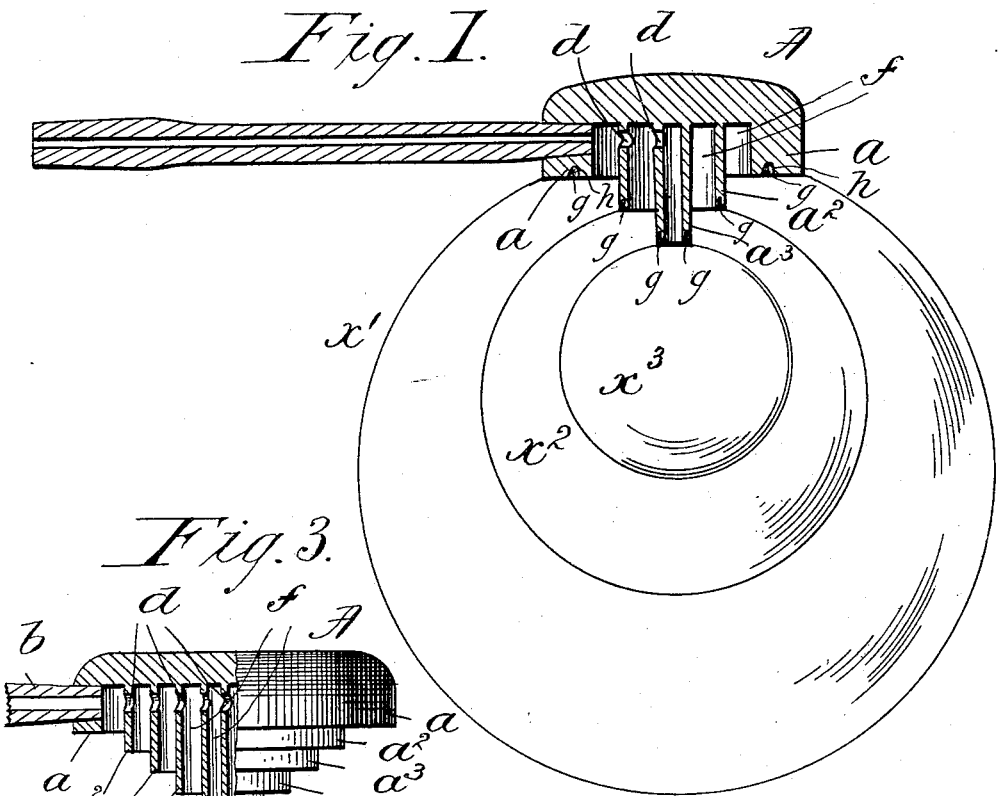
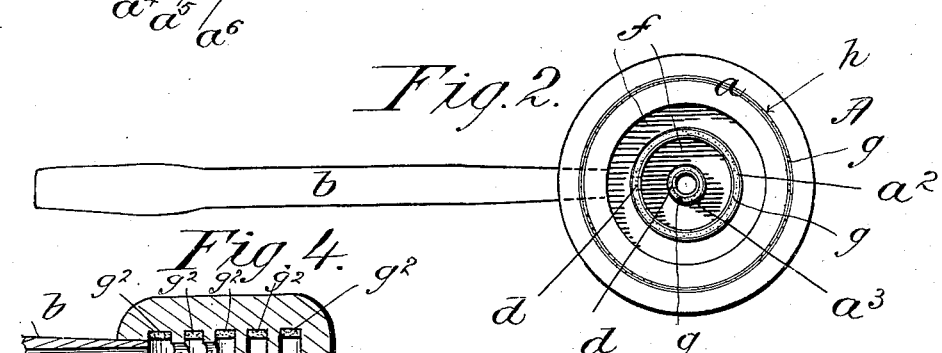
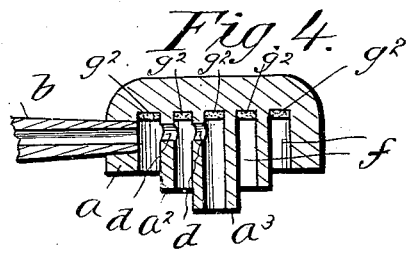
WITNESSES:
INVENTOR
Francis L. Cook,
BY
ATTORNEY.

UNITED STATES PATENT OFFICE.

FRANCIS L. COOK, OF SPRINGFIELD, MASSACHUSETTS, ASSIGNOR OF ONE-HALF TO FRANCKE W. DICKINSON, OF SAME PLACE.

BUBBLE-BLOWING DEVICE.

SPECIFICATION forming part of Letters Patent No. 677,307, dated June 25, 1901.

Application filed October 26, 1900. Serial No. 34,406. (No model.)

*To all whom it may concern:*

Be it known that I, FRANCIS L. COOK, a citizen of the United States of America, and a resident of Springfield, in the county of Hampden and State of Massachusetts, have invented certain new and useful Improvements in Bubble-Blowing Devices, of which the following is a full, clear, and exact description.

The present invention relates to a device for blowing two or more bubbles at one time; and the object of the invention is to produce a device for the said purpose which shall be efficient and successful in use, very cheap of manufacture, and durable; and the invention consists in a soap-bubble-blowing device made in accordance with the description hereinafter given and as illustrated in the accompanying drawings.

The device may be constructed with the capability of blowing any reasonable number of bubbles exceeding one—that is to say, I have made the device capable of blowing two bubbles and also capable of blowing six and seven.

Bubble-blowers constructed in accordance with my invention are illustrated in the accompanying drawings, in which—

Figure 1 is a central sectional view through the device, Fig. 2 being a plan view of the under side of Fig. 1. Fig. 3 is a partial central sectional view and a partial side view of a device similar to the one shown in Fig. 1, but having the capacity for blowing six bubbles instead of three, as indicated in said first figure. Fig. 4 is a sectional view of a device for blowing bubbles without providing special water.

In the drawings, A represents the head of the bubble-blower, of a general cylindrical form, comprising an annular depending wall or flange $a$ and therewithin one or more concentric depending annular walls or flanges $a^2$ $a^3$, and in Fig. 3 $a^4$, $a^5$, and $a^6$, and the stem or blow-tube $b$ enters the outer depending wall $a$ radially, while each of the walls therewithin inclosed has an aperture $d$ in line with said stem. Each depending circular flange or annular walls extend downwardly below the wall next outside thereof, as shown, and each depending annular wall is separated from the one next outside thereof by an annular channel or air-chamber $f$.

To operate the device, the same is dipped with the depending portions $a$ $a^2$, &c., downward, preferably into the soapy water or other suitably-prepared water, a liquid film adhering at the lower edge of each depending wall, and then by blowing through the tubular stem $b$ the air passing into the air-chamber $f$ within each wall through the apertures $d$ causes the expansion or inflation of each liquid film into a bubble, one being within and clearly separated from another, as is especially insured by the arrangement of the walls with their lower edges stepped the one lower than the respectively adjacent one.

The blower may be produced, preferably, from wood, the turned head being formed separately from the stem, which is fitted therein in the manner of the ordinary stem in a pipe, or the device may be produced with the head and stem integral, of clay or metal, or it may be produced either in separately formed and combined parts or integrally from any other suitable material as may be desired. Within the lower edge of each depending wall $a$ $a^2$, &c., a groove $h$ may be formed for the reception therein of an annular section $g$, of soap or other suitable substance for rendering water viscous and filmy. The device thus provided with the rings of soap, &c., as a part thereof enables bubble-blowing to be performed by dipping the head into merely pure water.

In Fig. 4 the device is shown provided with annular and circular sections $g^2$ of soap set in the annular chambers $f$ above the blast-holes, whereby by dipping the device in pure water the latter, coming in contact with the said annular soap sections, becomes rendered suitable for the production of bubbles at the lower circular edge of each annular wall upon the blowing through the device of air with suitable force.

Having thus described my invention, what I claim, and desire to secure by Letters Patent, is—

1. A soap-bubble-blowing device consisting of a circular head having an annular depending wall $a$ and therewithin one or more annular depending walls separated from the wall next outside thereof by an annular air-channel, a tubular stem entering through the outer wall $a$, and each internal wall having a radial aperture in line with the opening through the stem.

2. A bubble-blowing device consisting of a circular head having an outer annular depending wall or flange $a$, and therewithin one or more depending concentric annular walls as $a^2$ $a^3$, &c., each separated from the wall next outside thereof by an annular air-channel $f$, each inner annular wall extending downwardly farther than the one next outside and surrounding same, the tubular stem $b$ entering through the said outer wall to the first inclosed annular space $f$, and each inclosed depending wall having the radial aperture $d$ in line with the stem, substantially as described and shown.

3. The bubble-blowing device consisting of the head having annular wall $a$, and internal annular walls separated by annular downwardly-open air-chambers, a tubular stem entering the outer wall $a$, the apertures $d$ through the internal walls in line with the stem, and annular or circular sections of soap placed in each chamber $f$ above the line of the stem and of said apertures $d$.

Signed by me at Springfield, Massachusetts, in presence of two subscribing witnesses.

FRANCIS L. COOK.

Witnesses:
WM. S. BELLOWS,
C. F. CLARKE.